(12) United States Patent
Ramesh et al.

(10) Patent No.: US 8,250,064 B1
(45) Date of Patent: Aug. 21, 2012

(54) CACHING EXECUTION PLANS FOR QUERIES THAT USE TIMESTAMPS

(75) Inventors: Bhashyam Ramesh, Secunderabad (IN); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 319 days.

(21) Appl. No.: 12/754,694

(22) Filed: Apr. 6, 2010

(51) Int. Cl.
*G06F 17/30* (2006.01)

(52) U.S. Cl. .................................. 707/718; 707/714

(58) Field of Classification Search .............. 707/714, 707/718
See application file for complete search history.

(56) References Cited

U.S. PATENT DOCUMENTS

| | | | |
|---|---|---|---|
| 7,171,408 B2 * | 1/2007 | Zuzarte .................. | 707/999.001 |
| 7,962,481 B2 * | 6/2011 | Ganesh et al. ................. | 707/732 |
| 2005/0267866 A1 * | 12/2005 | Markl et al. ....................... | 707/2 |
| 2006/0218123 A1 * | 9/2006 | Chowdhuri et al. .............. | 707/2 |
| 2007/0050328 A1 * | 3/2007 | Li et al. ............................. | 707/2 |
| 2009/0024567 A1 * | 1/2009 | Gadde ............................... | 707/2 |
| 2009/0070313 A1 * | 3/2009 | Beyer et al. ....................... | 707/5 |
| 2009/0106440 A1 * | 4/2009 | Srinivasan et al. ............. | 709/231 |
| 2009/0125550 A1 * | 5/2009 | Barga et al. ................. | 707/104.1 |
| 2009/0182779 A1 * | 7/2009 | Johnson .......................... | 707/200 |
| 2010/0114868 A1 * | 5/2010 | Beavin et al. .................. | 707/718 |
| 2010/0306188 A1 * | 12/2010 | Cunningham et al. ........ | 707/713 |
| 2011/0029508 A1 * | 2/2011 | Al-Omari et al. .............. | 707/718 |
| 2011/0093491 A1 * | 4/2011 | Zabback et al. ................ | 707/769 |
| 2011/0131198 A1 * | 6/2011 | Johnson et al. ................ | 707/714 |

OTHER PUBLICATIONS

Teradata, "Teradata Join Indexes", http://datawarehouse.ittoolbox.com/documents/teradata-join-indexes-12848, (Mar. 28, 2007).

* cited by examiner

*Primary Examiner* — Cheryl Lewis
*Assistant Examiner* — Tiffany Thuy Bui
(74) *Attorney, Agent, or Firm* — Howard Speight

(57) ABSTRACT

A computer system programmed as a database receives a query Q1. Q1 includes a predicate. The predicate includes a reference to a current timestamp of time TT1. The database has R data structures. The computer system creates a plan, Plan 1, to execute Q1. Plan 1 includes the identification of a first set of data structures, P1, to be accessed in executing Plan 1, at the current timestamp of time TT1. The number of data structures in P1 is less than R. The computer system determines that Plan 1 is valid for a period of time. The computer system stores in a cache Plan 1 and an indication that Plan 1 is valid for the period of time.

16 Claims, 8 Drawing Sheets

CACHING EXECUTION PLANS FOR QUERIES THAT USE TIMESTAMPS

BACKGROUND

A query execution plan (or "plan") may be cached so that if the same query is executed, the cached plan can be used thus eliminating the often costly process of creating the plan. Determining whether to cache a plan for a query that contains a reference to a CURRENT_TIMESTAMP or TEMPORAL_TIMESTAMP is a challenge. For the purposes of this application, the term "query" should be interpreted broadly to include all kinds of "requests," including database utilities.

SUMMARY

In general, in one aspect, the invention features receiving a query Q1 in a computer system programmed as a database. Q1 includes a predicate. The predicate includes a reference to a current timestamp of time TT1. The database has R data structures. The computer system creates a plan, Plan 1, to execute Q1. Plan 1 includes the identification of a first set of data structures, P1, to be accessed in executing Plan 1, at the current timestamp of time TT1. The number of data structures in P1 is less than R. The computer system determines that Plan 1 is valid for a period of time. The computer system stores in a cache Plan 1 and an indication that Plan 1 is valid for the period of time.

Implementations of the invention may include one or more of the following. Determining that Plan 1 is valid for a period of time may include determining that a plan, Plan 2, to execute Q1 during a period between TT1 and TT2, TT2 being later than TT1, accesses a second set of data structures, P2, P2 being contained in P1. Determining that Plan 1 is valid for a period of time may include determining that Plan 2 uses an index data structure JI1 used by Plan 1 in executing Q1. The index data structure JI1 may be a join index. Determining that Plan 1 is valid for the period of time may include enhancing Q1 to include a condition testing a column of the database to determine if the values of the column fall in the period of time, determining that a plan, Plan 2, to execute the enhanced Q1 during the period of time, accesses a second set of data structures, P2, P2 being contained in P1, and determining that Plan 2 uses an index data structure used by Plan 1 in executing Q1. Determining that Plan 1 is valid for the period of time may include recognizing that Q1 includes a condition testing a column of the database to determine if the values of the column are after the current timestamp and setting the period of time to be all time after the current timestamp. The data structures may be partitions. P2 may be contained in P1 if every data structure in P2 is also in P1. The method may further include receiving a query Q2 in the temporal database, Q2 including a predicate, the predicate including a reference to a current timestamp of time TT3 and determining that Q2 is equivalent to Q1 and that TT3 is in the time period and in response, using the cached plan P1 to execute Q2. Determining that Q2 is equivalent to Q1 may include determining that Q2 is identical to Q1 except for their respective current timestamp values.

In general, in another aspect, the invention features a computer program, stored in a computer-readable tangible medium. The program includes executable instructions that cause a computer to receive a query Q1 in a computer system programmed as a database. Q1 includes a predicate. The predicate includes a reference to a current timestamp of time TT1. The database has R data structures. The program further includes executable instructions that cause the computer to create a plan, Plan 1, to execute Q1, Plan 1 including the identification of a first set of data structures, P1, to be accessed in executing Plan 1, at the current timestamp of time TT1. The number of data structures in P1 is less than R. The program further includes executable instructions that cause the computer to determine that Plan 1 is valid for a period of time. The program further includes executable instructions that cause the computer to store in a cache Plan 1 and an indication that Plan 1 is valid for the period of time.

DETAILED DESCRIPTION

Figure 1:
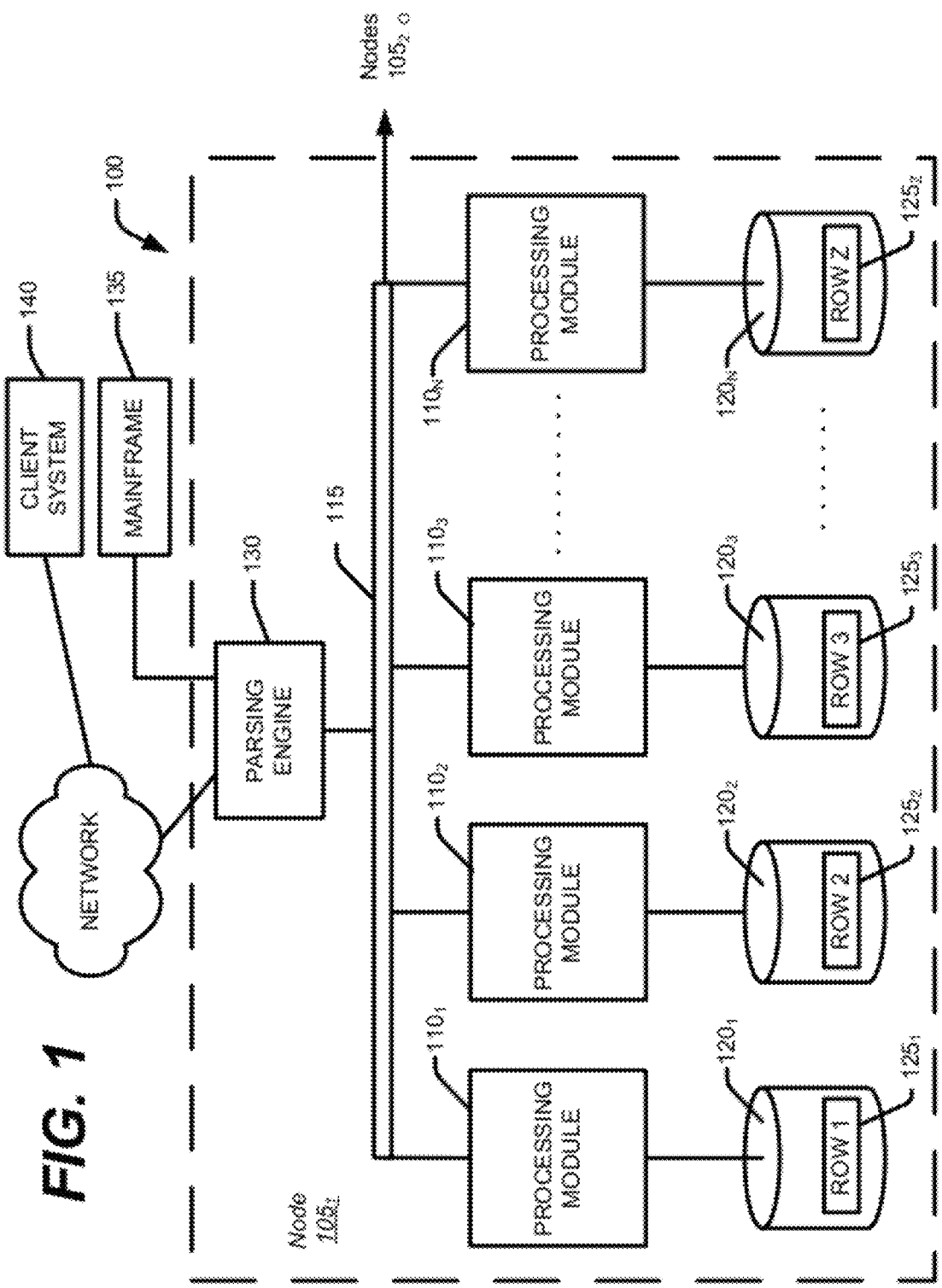
FIG. 1 is a block diagram of a node of a database system.

The technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
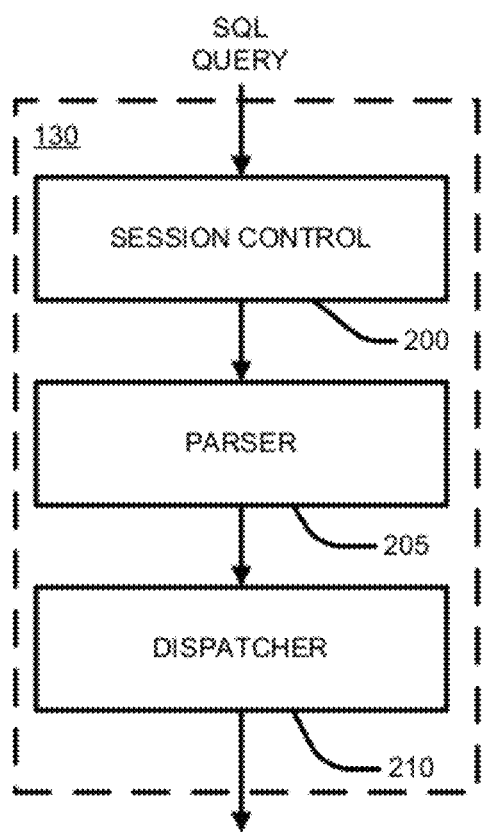
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
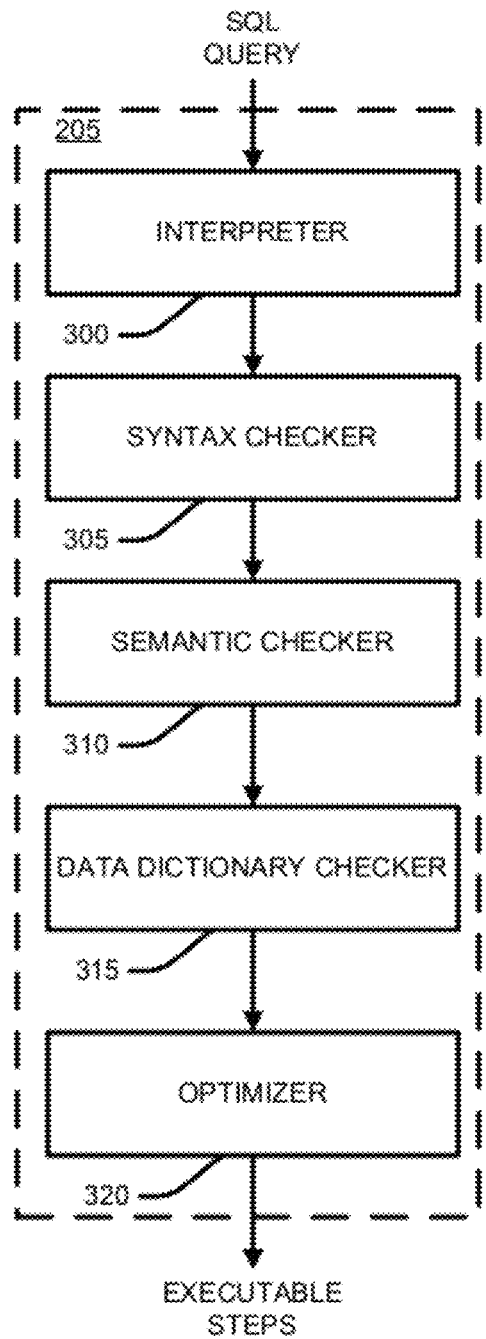
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

In one embodiment, built-in functions TEMPORAL_DATE and TEMPORAL_TIMESTAMP (collectively, the TEMPORAL_TS functions) are defined. In one embodiment, these built-in functions are named to avoid confusion with timestamp values CURRENT_DATE and CURRENT_TIMESTAMP. CURRENT_DATE and CURRENT_TIMESTAMP change with the passage of time even within the same transaction. In contrast, the TEMPORAL_TS functions are determined once and kept the same during the life of the transaction.

It is a challenge to cache a plan for a query that refers to (i.e., that contains a predicate including a reference to) CURRENT_TIMESTAMP or TEMPORAL_TIMESTAMP because such a cached plan appears to be useful only when another query is issued at the exact same moment. For CURRENT_TIMESTAMP such an eventuality is unrealistic. For TEMPORAL_TIMESTAMP such an eventuality is unlikely.

In one embodiment, the parcer 205 ignores the CURRENT_TIMESTAMP or TEMPORAL_TIMESTAMP value associated with the query in producing a plan. In such an approach, the optimizer may not use partition elimination or a join index. Partition elimination is a conventional process whereby database partitions are "eliminated," in the sense that they need not be accessed in processing the query. For example, if a database is partitioned into four partitions, one for each fiscal quarter, and a query includes a predicate limiting the scope of the query to only one of the partitions (e.g., the first fiscal quarter), then the other three partitions (containing, e.g., data from the second, third, and fourth fiscal quarters) would be eliminated in the sense that accessing the three eliminated partitions would not be included in the plan for processing the query. A join index is conventional and has characteristics of a view and characteristics of an index. Like a view, a join index is created using a query to specify the structure, composition, and source of its contents. A database system uses a join index to improve the efficiency of query processing.

One embodiment of the technique described herein identifies plans that refer to current timestamps and that use partition elimination and/or join indices and that are applicable for a period of time and are therefore cacheable and available for reuse out of a cache. In one embodiment, a cache-checking process is defined for determining if a plan exists in a cache for executing a new query. In one embodiment, the cache-checking process requires strict equality between the query being checked and the query for which a candidate cached plan was developed, including any functions, such as CURRENT_DATE and CURRENT_TIMESTAMP, which in ANSI are functions, that are replaced. In one embodiment, the check for queries containing CURRENT_DATE or TEMPORAL_DATE is different from the check for queries containing CURRENT_TIMESTAMP or TEMPORAL_TIMESTAMP because the value of CURRENT_DATE or TEMPORAL_DATE changes more slowly than that of CURRENT_TIMESTAMP or TEMPORAL_TIMESTAMP.

One embodiment of the technique for caching plans determines the time period for which the plan for a query will not change. In one embodiment, the parser 205, which decides whether to cache a particular plan, exercises the partition-elimination process for the query at points of time in the future using temporarily replaced values for CURRENT_TIMESTAMP and/OR TEMPORAL_TIMESTAMP and, if the resulting partition elimination is stable for a period of time, caches the plan along with the period of time. In one embodiment, partition elimination is stable at a future point in time if the set of eliminated partitions identified at the future point in time is a subset of the eliminated partitions identified for the original point in time.

In one embodiment, in determining the time period for which the plan for a query will not change, the optimizer 350 exercises the join index selection process for the query at points of time in the future using temporarily replaced values for CURRENT_TIMESTAMP and/OR TEMPORAL_TIMESTAMP and, if the selected join index is the same for a period of time, caches the plan along with the period of time.

Figure 4:
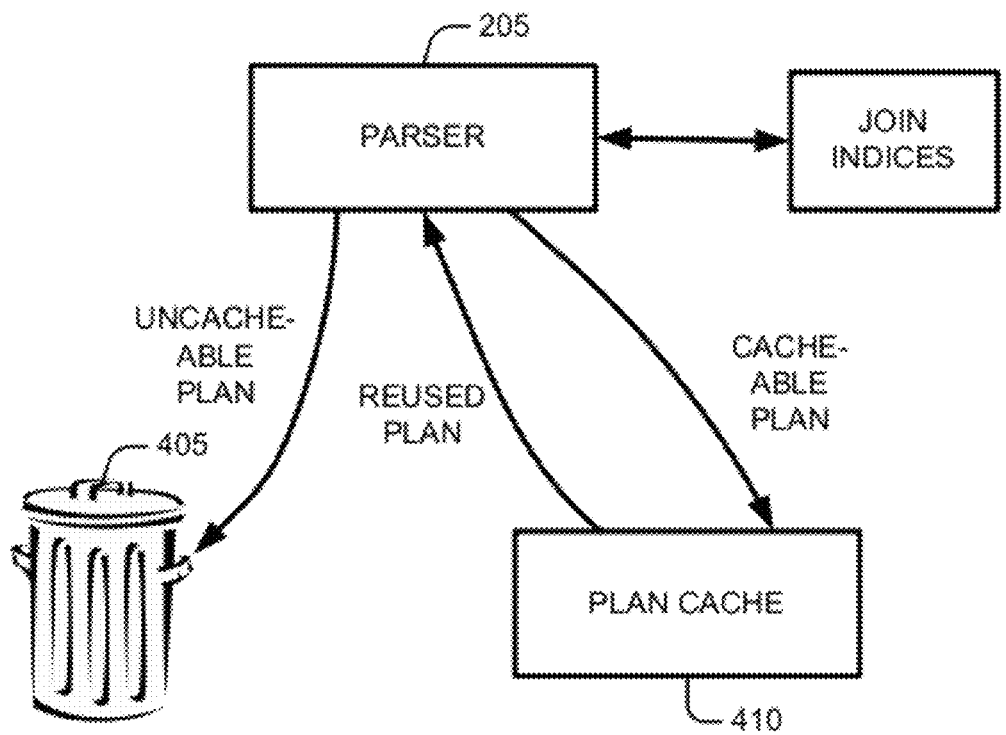
FIG. 4 is a general illustration of one embodiment of plan caching.

One embodiment of the process is generally illustrated in FIG. 4. In one embodiment, the optimizer creates a plan and evaluates it as described above and in more detail below and determines that a newly created plan is uncacheable, in which case it is discarded after it is used to process the query. Discarding the uncacheable plan is represented by the "uncacheable plan" arrow to the trash can 405. In one embodiment, if the plan is found to be cacheable it, a representation of the query that the plan was created to execute, and the time period for which the plan is valid, is stored in a plan cache 410, as represented by the "cacheable plan" arrow to the plan cache 410. In one embodiment, when a query is parsed and optimized the first time the caching decision also determines the time duration for which the plan is valid. If same query is received again, the optimization and processing described above are not followed. Instead, the applicability of the cached plan is determined based on whether the timestamp is within the recorded time duration specified for the validity of the plan. This is in addition to determining whether the query is the same, etc.

Figure 5:
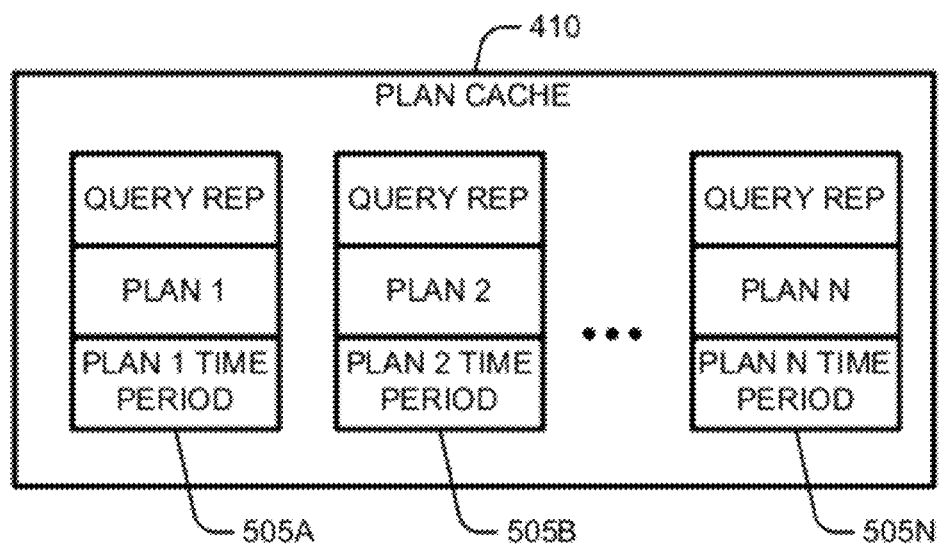
FIG. 5 is an illustration of one embodiment of a plan cache.

In one embodiment, in processing the subsequently received version of the same query, the parser 205 will determine that the query matches, or, in one embodiment, is identical to, a previously-processed query for which a plan was cached in the plan cache. It does this by examining the representations of the queries that are stored with the cached plans. The optimizer will then determine if the partition set identified for the new query is contained in the partition set identified for the original query, the join index identified for the new query is the same as the join index identified for the original query, and the temporal constraint (i.e., the CURRENT_TIMESTAMP or TEMPORAL_TIMESTAMP) fits within the time period for which the cached plan is valid. If those conditions are satisfied, the cached plan is selected from the plan cache 410, as indicated by the "reused plan" arrow from the plan cache 410 to the parser 205, and is used to process the new query. In one embodiment, the plan cache 410, illustrated in FIG. 5, contains cached plans 505A through 505N. Each cached plan includes a representation of the query that was the basis of the cached plan's creation (labeled "Query Rep" in FIG. 5), the plan, which is the detailed steps required to execute the query (labeled "Plan 1," etc.), and the period of time for which the plan is valid (labeled "Plan 1 Time Period," etc.). In one embodiment, the representation of the query is the exact language of the query. In one embodiment, the representation of the query is contained in a table listing essential elements of the query, such as tables accessed, operators, etc.

Figure 6:
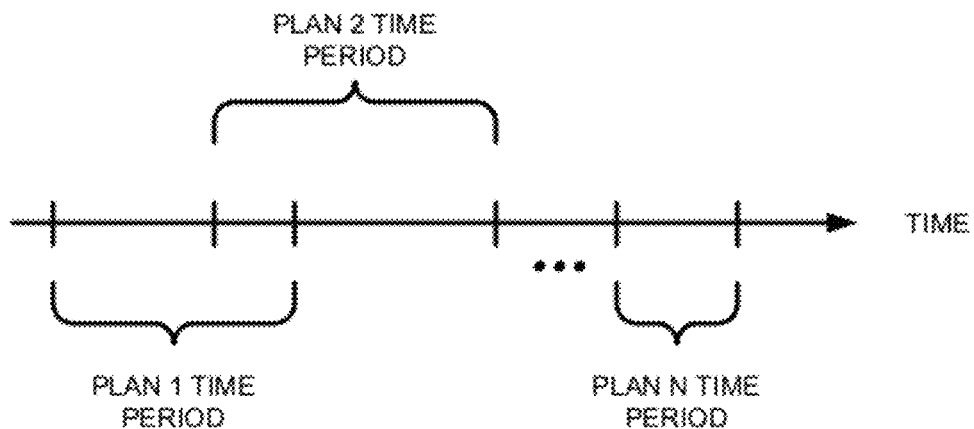
FIG. 6 illustrates the relationships of various time periods over which various plans are valid.

The time periods for which the cached plans are valid are illustrated in FIG. 6. The time periods can overlap, as the time period for Plan 1 overlaps the time period for Plan 2, or not, as the time period for Plan N does not overlap either of the other time periods illustrated.

There are multiple ways to determine the time period for which a plan is valid. In one embodiment, the time period is determined by evaluating the plan for each successive time granule from time TT1 to a later time TT2. If the plan generated at a time granule is compatible with the plan generated at TT1, then the plan is valid up to that time granule. The process stops at an end time granule when the plan generated for the end time granule is not compatible with the plan generated at TT1. The plan is valid for every time granule from TT1 up to, but not including, the end time granule.

In one embodiment, the query conditional expression with CURRENT_TIMESTAMP and/or TEMPORAL_TIMESTAMP is enhanced with a duration expression (e.g., from TT1 to TT2) on CURRENT_TIMESTAMP and/or TEMPORAL_TIMESTAMP. A plan is applicable for the duration TT1 to TT2 if the plan is compatible with the plan generated at TT1. For example, assume a table, such as a partitioned primary index ("PPI"), is partitioned into three partitions (partitions P1, P2, and P3) based on some table column X. If the query expression has a condition on X of the form X=CURRENT_TIMESTAMP then, in one embodiment, this expression is changed as X=TT1 and the plan is generated with partition P2. Another plan is generated with the enhanced expression of X BETWEEN TT1 and TT2. If the partition list for the enhanced expression is P2 then the plan is compatible with the plan at TT1. If, on the other hand, the partition list for the enhanced expression is P2 and P3, then the plan is not compatible with the plan at TT1 because the plan at TT2 requires access to partition P3 which is not accessed by the plan at TT1. This type of analysis will determine the range for which the plan is applicable.

As another example of specifying a range expression if the query expression has a condition of the form X>CURRENT_TIMESTAMP, the expression can be enhanced as X><time-variable> and <time-variable> BETWEEN TT1 and TT2. The plan generated for the enhanced expression is evaluated for compatibility with the plan generated at TT1. If it is compatible, the plan is applicable for every time granule for the time duration TT1 to TT2.

Note that as a general observation, if the query expression requires a result (and therefore a plan) for times that are always greater than a point in time, then that plan is applicable, and therefore cacheable, for all points in time greater than the point in time for which the plan was generated.

For example, assume the query has a predicate of the form:
WHERE . . . .
column><point in time1>
. . . .

Then, for all <point in time2> greater than <point in time1> the plan developed at <point in time1> is applicable in the sense that it will not produce a wrong result. It may, however, be a suboptimal approach.

Figure 7:
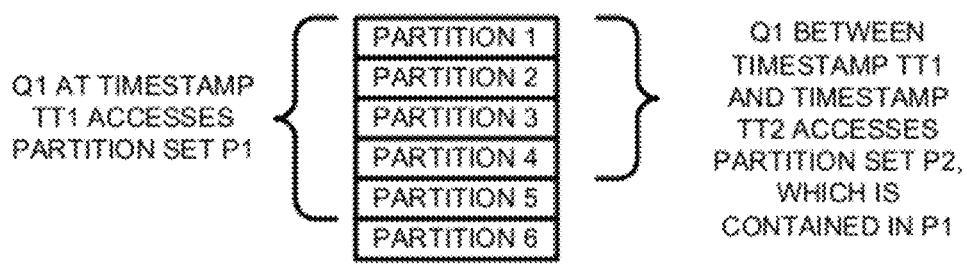
FIG. 7 illustrates one set of partitions contained within another set of partitions.

The concept of one partition set being contained within (or being a subset of) another partition set is illustrated in FIG. 7. In FIG. 7, query Q1 at timestamp (CURRENT_TIMESTAMP or TEMPORAL_TIMESTAMP) TT1 accesses partition set P1, which is partitions 1, 2, 3, 4, and 5. The same query Q1 between timestamp TT1 and timestamp TT2, which is different from and later than TT1, accesses a different subset of partitions P2, which is partitions 1, 2, 3, and 4. P2 is a subset of P1. In that case, at least from the perspective of partition elimination, the plan developed to execute query Q1 at time TT1 can be used for the period from TT1 to TT2. The plan may be usable outside that period, although such a use may not be optimal.

Figure 8:
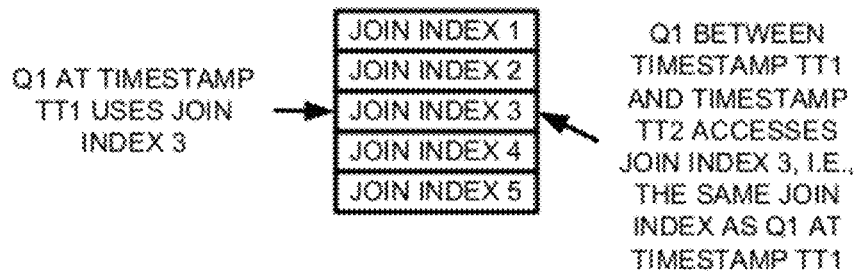
FIG. 8 illustrates join index identity.

The concept of join index equality or identity is illustrated in FIG. 8. Query Q1 at timestamp TT1 uses join index 3. If the same query Q1 uses the same join index 3 for the duration from timestamp TT1 and timestamp TT2, which is different from and later than TT1, the join index selection comparison would qualify the plan used for Q1 at TT1 for the period of time from TT1 through TT2.

The actual value of CURRENT_TIMESTAMP and TEMPORAL_TIMESTAMP is bound (i.e., evaluated and used) when the cached plan is selected and dispatched for execution. In Teradata terminology this will be during gncapply( ). The plan is a pseudo bound plan. This means the values of CURRENT_TIMESTAMP and TEMPORAL_TIMESTAMP are bound during partition elimination and join index selection. Once the selection is made the values used for the selection are retained but they are not replaced in the plan. They are put in to the plan as USING values and actual values are bound in the concrete step generation in gncapply( ).

Figure 9:
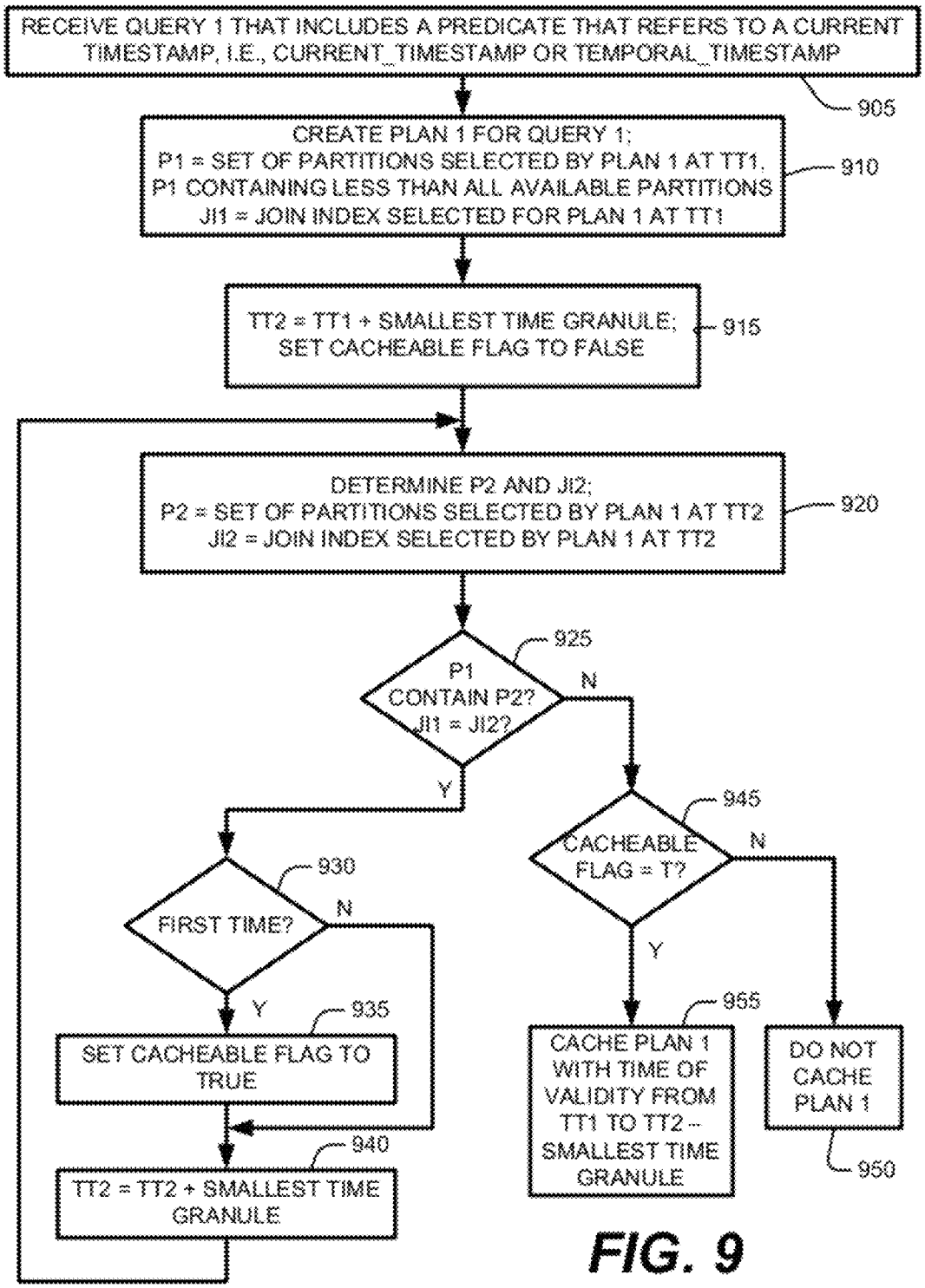
FIGS. 9-12 are flow charts.

One embodiment of the caching technique, illustrated in FIG. 9, begins by receiving a first query, Query 1 (block 905). In one embodiment, Query 1 includes a predicate that refers to a current timestamp, i.e., CURRENT_TIMESTAMP or TEMPORAL_TIMESTAMP. In one embodiment, a query plan, Plan 1, is created for Query 1 using the current time, TT1 (block 910). Plan 1 identifies a set of partitions, P1, to be accessed in executing Plan 1 at time TT1. In one embodiment, P1 contains less than all of the partitions in the database system; i.e., P1 is a "proper" subset, as that term is used in mathematics, of the partitions in the database system. In one embodiment, P1 contains all of the partitions in the database system. In one embodiment, join index JI1 is selected for use with Plan 1 at TT1.

In one embodiment, once Plan 1 has been created the technique enters a loop to determine if Plan 1 is cacheable. The loop is initialized by setting TT2 to the value of TT1 plus a smallest time granule and setting a Cacheable Flag to False (block 915). In one embodiment, the "smallest time granule" is the smallest time period recognized by the system hardware and/or the system software.

In one embodiment, the smallest time granule is the amount of time during which the cache is not flushed. In one embodiment, this period is 4 hours. In one embodiment, the loop is entered by determining P2, which is the set of partitions selected by the optimizer to arrive at Plan 1 at TT2 (i.e., TT1+smallest time granule), and JI2, the join index selected by the optimizer to arrive at Plan 1 at TT2 (block 920). In one embodiment, the loop then determines if P1 contains P2 and if JI1=JI2 (block 925). If so ("Y" branch out of block 925) and this is the first time this test has yielded a "True" (block 930; "Y" branch out of block 930), in one embodiment the Cacheable Flag is set to True (block 935), indicating that Plan 1 is cacheable at least from TT1 to the current TT2. In one embodiment, the loop increases TT2 by setting TT2 to TT2+ smallest time granule (block 940) and returns to the beginning of the loop at block 920. In one embodiment, this loop will repeat until P1 does not contain P2 or JI1 does not equal JI2.

Returning to decision element 925, in one embodiment if P1 does not contain P2 or JI1 does not equal JI2 ("N" branch out of block 925), this indicates that the end of the range of times over which Plan 1 is cacheable has been found, that Plan 1 is well formed and that Plan 1 is valid for all times between TT1 and TT2. In one embodiment, if the Cacheable Flag is set to False (block 945; "N" branch out of block 945), it is determined not to cache Plan 1 (block 950). In that case, Plan 1 is discarded once it has been used to execute Query 1. If the Cacheable Flag is set to True ("Y" branch out of block 945), Plan 1 is cached with a time of validity from TT1 to TT2— smallest time granule.

Figure 10:
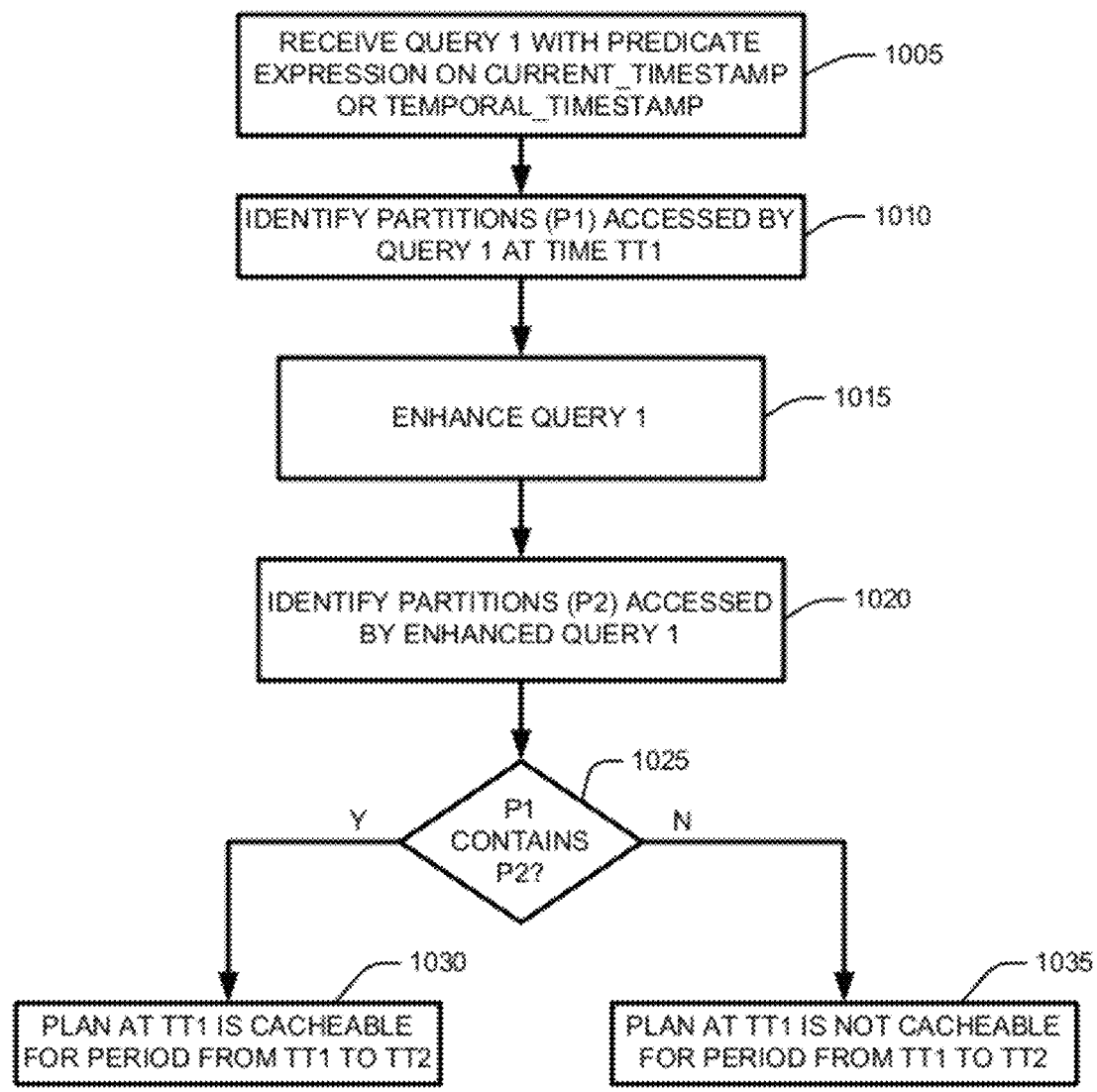

In one embodiment, illustrated in FIG. 10, the system receives a query 1 having one or more predicate expressions with CURRENT_TIMESTAMP or TEMPORAL_TIMESTAMP for which suitability for caching is determined based on range computation (block 1005). For example, the query might include a "greater than" expression on the timestamp (e.g., X>CURRENT_TIMESTAMP). The partitions (P1) accessed by query 1 at time TT1 are determined (block 1010). Query 1 is then enhanced to replace the timestamp with a time variable and to include a predicate testing the time variable from TT1 to TT2 (e.g., X><time_variable> AND TT1<time_variable<TT2) (block 1015). The partitions (P2) accessed by the enhanced query are then identified (block 1020). If P1 contains P2 ("Y" branch out of block 1025), the plan developed at TT1 is cacheable for the period from TT1 to TT2 (block 1030). Otherwise, the plan developed at TT1 is not cacheable for the period from TT1 to TT2 (block 1035).

Figure 11:
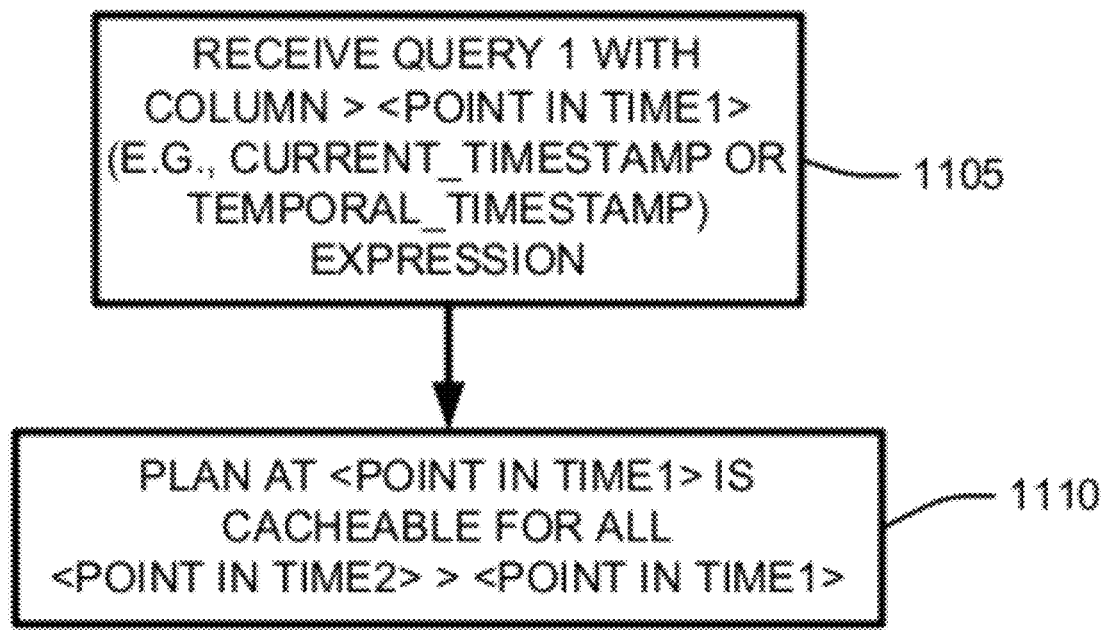

In one embodiment, illustrated in FIG. 11, the system receives a query 1 including a predicate in which a column is tested for the condition greater than (>) against a point in time such as CURRENT_TIMESTAMP or TEMPORAL_TIMESTAMP, e.g., <point in time1> (block 1105). In that case the plan for executing query 1 developed for <point in_time1> is valid for all <point in time2>><point in time1> (block 1110).

Figure 12:
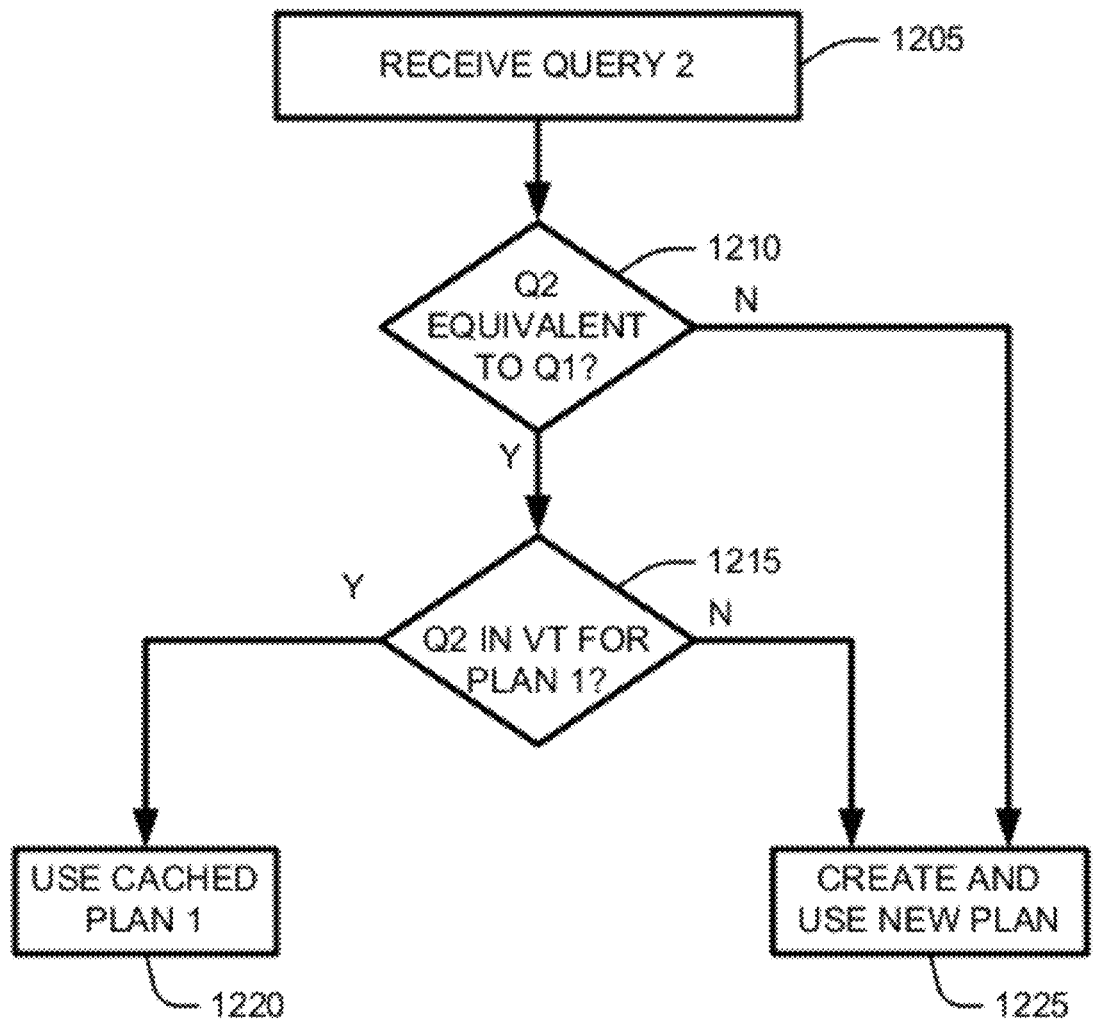

In one embodiment, when a new query, Query 2, is received (block 1205), as illustrated in FIG. 12, Query 2 is compared to the query representation for Query 1 attached to Plan 1 in the plan cache 410. In one embodiment, if Query 2 is equivalent to Query 1 (block 1210) and the timestamp for Query 2 is in the valid time period for Plan 1 stored in the plan cache 410 (block 1215; "Y" branch from block 1215), cached Plan 1 is used to execute Query 2 (block 1220). Otherwise, in one embodiment, if Query 2 is not equivalent to Query 1 ("N" branch out of block 1210) or if Query 2 is not in the valid time period for Plan 1 ("N" branch out of block 1215), a new plan is created and executed for Query 2 (block 1225).

In one embodiment, Query 2 is equivalent to Query 1 if Query 2 is identical to Query 1, with the exception of any evaluation of a current timestamp value.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   receiving a query Q1 in a computer system programmed as a database, Q1 including a predicate, the predicate including a reference to a current timestamp of time TT1, the database having R data structures;
   the computer system creating a plan, Plan 1, to execute Q1, Plan 1 including the identification of a first set of data structures, P1, to be accessed in executing Plan 1, at the current timestamp of time TT1, the number of data structures in P1 being less than R;
   the computer system determining that Plan 1 is valid for a period of time by determining that a plan, Plan 2, to execute Q1 during a period between TT1 and TT2, TT2 being later than TT1, accesses a second set of data structures, P2, P2 being contained in P1;
   storing in a cache:
      Plan 1; and
      an indication that Plan 1 is valid for the period of time;
   receiving a query Q2 in the database, Q2 including a predicate, the predicate including a reference to a current timestamp of time TT3; and
   determining that Q2 is equivalent to Q1 and that TT3 is in the period between TT1 and TT2 and in response, using the cached plan, Plan 1, to execute Q2.

2. The method of claim 1 wherein determining that Plan 1 is valid for a period of time comprises:
   determining that Plan 2 uses an index data structure JI1 used by Plan 1 in executing Q1.

3. The method of claim 2 wherein:
   the index data structure JI1 is a join index.

4. The method of claim 1 wherein determining that Plan 1 is valid for the period of time comprises:
   enhancing Q1 to include a condition testing a column of the database to determine if the values of the column fall in the period of time;
   determining that the plan, Plan 2, to execute the enhanced Q1 during the period of time, accesses a second set of data structures, P2, P2 being contained in P1; and
   determining that Plan 2 uses an index data structure used by Plan 1 in executing Q1.

5. The method of claim 1 wherein determining that Plan 1 is valid for the period of time comprises:
   recognizing that Q1 includes a condition testing a column of the database to determine if the values of the column are after the current timestamp; and
   setting the period of time to be all time after the current timestamp.

6. The method of claim 1 wherein the data structures are partitions.

7. The method of claim 1 wherein P2 is contained in P1 if every data structure in P2 is also in P1.

8. The method of claim 1 wherein determining that Q2 is equivalent to Q1 comprises determining that Q2 is identical to Q1 except for their respective current timestamp values.

9. A computer program, stored in a non-transitory computer-readable medium, the program comprising executable instructions that cause a computer to:
receive a query Q1 in a computer system programmed as a database, Q1 including a predicate, the predicate including a reference to a current timestamp of time TT1, the database having R data structures;
create a plan, Plan 1, to execute Q1, Plan 1 including the identification of a first set of data structures, P1, to be accessed in executing Plan 1, at the current timestamp of time TT1, the number of data structures in P1 being less than R;
determine that Plan 1 is valid for a period of time by determining that a plan, Plan 2, to execute Q1 during a period between TT1 and TT2, TT2 being later than TT1, accesses a second set of data structures, P2, P2 being contained in P1;
store in a cache:
Plan 1; and
an indication that Plan 1 is valid for the period of time;
receive a query Q2 in the database, Q2 including a predicate, the predicate including a reference to a current timestamp of time TT3; and
determine that Q2 is equivalent to Q1 and that TT3 is in the period between TT1 and TT2 and in response, use the cached plan, Plan 1, to execute Q2.

10. The computer program of claim 9 wherein, when determining that Plan 1 is valid for a period of time, the computer:
determines that Plan 2 uses an index data structure JI1 used by Plan 1 in executing Q1.

11. The computer program of claim 10 wherein:
the index data structure JI1 is a join index.

12. The computer program of claim 9 wherein, when determining that Plan 1 is valid for the period of time, the computer:
enhances Q1 to include a condition testing a column of the database to determine if the values of the column fall in the period of time;
determines that the plan, Plan 2, to execute the enhanced Q1 during the period of time, accesses a second set of data structures, P2, P2 being contained in P1; and
determines that Plan 2 uses an index data structure used by Plan 1 in executing Q1.

13. The computer program of claim 9 wherein, when determining that Plan 1 is valid for the period of time, the computer:
recognizes that Q1 includes a condition testing a column of the database to determine if the values of the column are after the current timestamp; and
sets the period of time to be all time after the current timestamp.

14. The computer program of claim 9 wherein the data structures are partitions.

15. The computer program of claim 9 wherein P2 is contained in P1 if every data structure in P2 is also in P1.

16. The computer program of claim 9 wherein, when determining that Q2 is equivalent to Q1, the computer determines that Q2 is identical to Q1 except for their respective current timestamp values.

* * * * *